United States Patent [19]

Bhatti

[11] 4,402,719

[45] Sep. 6, 1983

[54] METHOD AND APPARATUS FOR FORMING GLASS FIBERS

[75] Inventor: Mohinder S. Bhatti, Newark, Ohio

[73] Assignee: Owens-Corning Fiberglas Corporation, Toledo, Ohio

[21] Appl. No.: 378,663

[22] Filed: May 17, 1982

Related U.S. Application Data

[63] Continuation of Ser. No. 200,647, Oct. 27, 1980, abandoned.

[51] Int. Cl.³ .................................... C03B 37/025
[52] U.S. Cl. .................................... 65/1; 29/163.5 R; 65/374.12; 428/670; 428/940
[58] Field of Search ................ 65/1, 2, 374.12; 428/670, 940; 29/163.5 R; 219/121 EM

[56] References Cited

U.S. PATENT DOCUMENTS

| | | | |
|---|---|---|---|
| 2,555,372 | 6/1951 | Ramage | 204/38 |
| 2,777,254 | 1/1957 | Siefert et al. | |
| 3,132,928 | 5/1964 | Crooks et al. | 29/198 |
| 3,134,659 | 5/1964 | Labino | 65/2 |
| 3,147,547 | 9/1964 | Kuebrich et al. | 29/528 |
| 3,157,482 | 11/1964 | Nero et al. | 65/17 |
| 3,206,846 | 9/1965 | Slayter et al. | 29/470 |
| 3,235,646 | 2/1966 | Sens | 13/6 |
| 3,248,190 | 4/1966 | Woodward et al. | 65/1 |
| 3,371,409 | 3/1968 | Bonnet et al. | 29/528 |
| 3,461,058 | 12/1969 | Westfield et al. | 204/290 |
| 3,480,523 | 11/1969 | Tyrrell | 204/43 |
| 3,511,306 | 5/1970 | Warkoczewski | 65/15 |
| 3,518,066 | 6/1970 | Bronnes et al. | 29/195 |
| 3,657,784 | 4/1972 | Selman et al. | 29/195 |
| 3,736,109 | 5/1973 | Darling et al. | 29/195 |
| 3,741,735 | 6/1973 | Buttle | 29/198 |
| 3,827,953 | 8/1974 | Haldeman | 204/37 R |
| 3,875,028 | 4/1975 | Atlee et al. | 204/37 R |
| 3,947,333 | 3/1976 | Bianchi et al. | 204/129 |
| 3,971,646 | 7/1976 | Rhodes | 65/157 |
| 3,973,920 | 8/1976 | Tadokoro et al. | 29/194 |
| 4,036,601 | 7/1977 | Weimar et al. | 428/663 |
| 4,066,864 | 1/1978 | Heitmann | 219/121 EM |
| 4,105,828 | 8/1978 | Borchert et al. | 428/665 |
| 4,140,507 | 2/1979 | Costin et al. | 65/2 |
| 4,326,871 | 4/1982 | Harris | 65/12 |

FOREIGN PATENT DOCUMENTS

| | | | |
|---|---|---|---|
| 1033627 | 6/1966 | United Kingdom | 65/1 |
| 1242921 | 8/1971 | United Kingdom | 65/1 |

OTHER PUBLICATIONS

Hot Isostatic Processing MCIC-77-34 Battele Labs, Columbus, Ohio, Nov. 1977 pp. 1-99.

Primary Examiner—Robert L. Lindsay, Jr.
Attorney, Agent, or Firm—Ronald C. Hudgens; Robert F. Rywalski; Greg Dziegielewski

[57] ABSTRACT

A laminated wall for a feeder for supplying molten streams of glass to be attenuated into filaments comprising a refractory metal core having an oxygen impervious, precious metal sheath intimately bonded thereto by hot isostatically pressing to form a laminate, said laminate having at least one aperture extending therethrough; and a tubular member having a sleeve having a projection extending beyond a first flange located intermediate said first flange and a second flange, said tubular member being sealed to said laminate to prevent the oxidization of said core at elevated temperatures.

30 Claims, 5 Drawing Figures

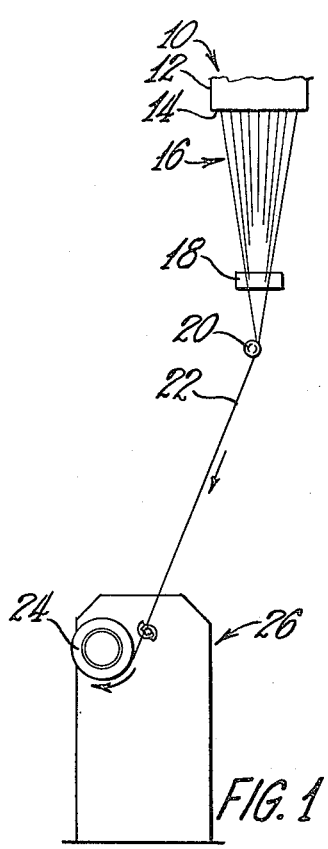
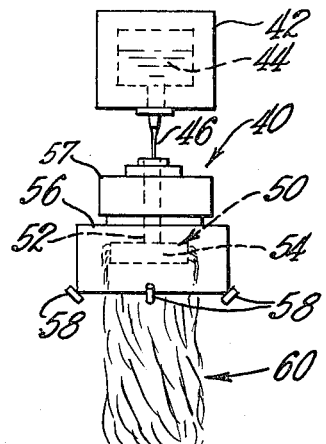
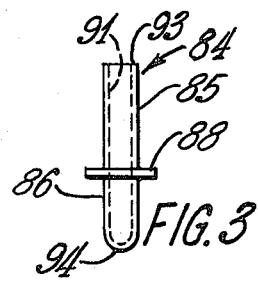
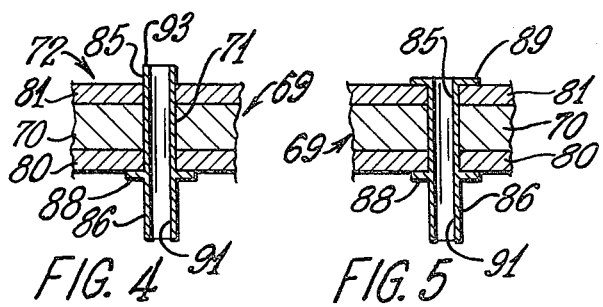
FIG. 1
FIG. 2
FIG. 3
FIG. 4
FIG. 5

METHOD AND APPARATUS FOR FORMING GLASS FIBERS

This is a continuation, of application Ser. No. 200,647, filed Oct. 27, 1980 abandoned.

TECHNICAL FIELD

The invention disclosed herein relates to a glass fiber forming feeder having at least one laminated wall comprised of a refractory metal substrate having an oxygen impervious, precious metal sheath intimately bended thereto by means of hot isostatically pressing the precious metal sheath to the refractory metal substrate.

BACKGROUND ART

There has been a long-felt need to produce a long lasting feeder for flowing streams of molten inorganic material, such as glass, at operating temperatures higher than currently practiced.

Much of the previous work was directed to forming alloys having superior properties over the unalloyed metals. Feeders in the textile art, or fixed bushing art, have historically been made from alloys of platinum and rhodium. Feeders in the wool art, or rotatable feeders, have been produced employing Cobalt based alloys.

The present invention provides inorganic fiber forming feeders wherein the high temperature strength characteristics of refractory metals are combined with the oxidation resistance of precious metals to produce feeders capable of operating at temperatures higher and longer periods of time than heretofore commercially practicable.

DISCLOSURE OF THE INVENTION

This invention pertains to a laminated wall for a feeder for supplying molten streams of inorganic material to be attenuated into filaments comprising a refractory metal core having an oxygen impervious precious metal sheath intimately bonded thereto by hot isostatic pressing, said wall having at least one orifice extending therethrough adapted to pass said molten material therethrough.

BRIEF DESCRIPTION OF THE DRAWINGS

FIG. 1 is a semi-schematic front elevational view of a glass textile type fiber forming system.

FIG. 2 is a semi-schematic front elevational view of a glass wool or rotary fiber forming system.

FIG. 3 is an enlarged cross sectional view of the mid-flanged eyelet employed in the system shown in FIGS. 1 and 2.

FIG. 4 is an enlarged cross sectional view of a portion of the feeder wall during fabrication having a mid-flanged, hollow, tubular member inserted therethrough.

FIG. 5 is an enlarged cross sectional view of a feeder wall according to the principles of this invention.

BEST MODE OF CARRYING OUT THE INVENTION

As shown in FIG. 1, feeder 10, which is comprised of containment or sidewalls 12 and a bottom, working or stream defining wall 14, is adapted to provide a plurality of streams of molten inorganic material, such as glass. The streams of molten glass can be attenuated into filaments 16 through the action of winder 26.

As is known in the art, size applicator means 18 is adapted to provide a coating or sizing material to the surface of the glass filaments which advance to gathering shoe or means 20 to be gathered into a strand or bundle 22. Strand 22 is then wound into package 24 upon a collet of winder 26. Thus, FIG. 1 schematically represents a "textile" fiber forming system.

As shown in FIG. 2, rotary system 40 is comprised of a flow means or channel 42 having a body of molten inorganic material 44, such as glass, therein. A stream of molten glass 46 is supplied to rotary feeder or rotor 50 from channel 42, as is known in the art.

Rotor 50, which is adapted to be rotated at high speeds is comprised of a quill 52 and a circumferential fiberizing or working wall 54 having a plurality of passageways 91 therethrough adapted to supply a plurality of streams of molten inorganic material to be fiberized.

In conjunction with rotor 60, a shroud 56 and circumferential blower or fluidic attenuation means 57 are adapted to fluidically assist in the attenuation of the streams of molten material into fibers or filaments 60. A binder material or coating may be applied to fiber 60 by means of binder applicators 58, as is known in the art.

As is shown in the drawings, the fiberization or working walls 14 and 54 of the feeders 10 and 50 should be based upon laminate comprised of a refractory metal core having an oxygen impervious, precious metal sheath intimately bonded thereto by hot isostatic pressing (i.e. HIP) as is disclosed in concurrently filed patent application Ser. No. 200677, filed on Oct. 27, 1980, in the name of Mohinder S. Ehattf, which is hereby incorporated by reference.

Particularly, such refractory metals are selected from the group of materials consisting of molybdenum (Mo), columbium (Ob), tungsten (W), rhenium (Re), tantalum (Ta), hafnium (Hf), titanium (Ti), chromium (Or), zirconium (Zr), vanadium (V) and base alloys of such refractory metals. For example, an alloy of molybdenum, titanium and zirconium, known as TZM, has been shown to provide a superior laminated wall for a fiber forming feeder when clad with a precious metal alloy of platinum and rhodium.

Particulary, the precious metals are selected from a group consisting of platinum (Pt), paladium (Pd), iridium (Ir), osmium (Os), rhodium (Rh), ruthenium (Ru), and alloys based on such metals. Included in the platinum alloys are H alloy and J alloy which are alloys of platinum and rhodium of 90%/10% and 75%/25% composition, respectively.

As disclosed in the aforementioned concurrently filed patent application, care should be taken in the preparation of the surfaces of the substrate and precious metal layers to insure a good bond between the core and sheath.

Simply stated, the sheath is formed to closely conform to the exterior of the core, with the surfaces thereof being appropriately cleaned to promote a good metallurgical bond therebetween. The core is inserted or enclosed within the sheath to form a prelaminate unit having at least one edge or portion thereof open to the atmosphere to facilitate "out gasing". Then the prelaminate unit is heated in a vacuum to "out gas" the unit. Subsequent to the out gasing, the open edge or seams of the unit are welded or sealed in a vacuum, whereupon the unit is ready to be hot isostatically pressed to form laminate 69.

As shown in FIG. 3, tubular member 84 is comprised of a sleeve 85 having a projection 86 extending beyond first flange 88. That is, first flange 88 is located intermediate the two ends 93 and 94 of sleeve 85.

Sleeve 85 defines passageway 91 which is or will be adapted to permit molten glass to flow therethrough.

Tubular member 84 may have passageway 91 extending from one end to the other or second end 94 may be closed as shown in FIG. 3. As such, after tubular member 84 is inserted into the laminate 69, according to the principles of this invention second and 94 will then be then machined or opened to expose passageway 91 at the second end 94.

Preferably, hollow tubular element 84 is a precious metal and preferably is substantially identical with the precious metal sheath material, although different but compatible materials may be employed.

As shown in FIG. 4 laminate 69 is comprised of core or substrate 70 and precious metal sheath 72 that has been hot isostatically pressed to intimately bond the sheath 72 to core 70. Sheath 72 is comprised, at least in part, of first plate 80 and second plate 80 intimately bonded to core 70.

A plurality of apertures 71 are formed in laminate 69 to provide a fiber forming feeder having the capability to provide numerous molten streams of glass to be attenuated into filaments. However, only one such aperture 71 and a fragment of laminate 69 are shown in FIGS. 4 and 5.

Preferably, aperture 71 is formed in laminate 69 subsequent to the HIP'ing process to form laminate 69. However, it is to be understood that aperture 71, which extends through core 70 and sheath 72, may be established by providing a core and sheath having mating holes which can be registered with respect to one another to establish apertures 71.

In practice, tubular member 84 is inserted in aperture 71 such that first flange 88 is brought into contact or abutting engagement with first plate 80 of sheath 72. A portion of sleeve 85 or first end 93 thereof, projects beyond the exterior surface of second plate 81 a distance sufficient to permit second flange 89 to be formed therefrom. Flange 89 is formed so as to firmly contact the exterior surface of second plate 81.

To protect core 70 from oxidization at elevated temperatures, tubular member 84 should be sealed to laminate 69. In one method, first and second flanges 88 and 89 are welded to first and second plates 80 and 81 respectively by any suitable welding technique, such as electron beam or laser welding. Preferably, such welding should take place in a vacuum to remove any gas from between the wall of orifice 71 and tubular member 84.

Preferably, tubular member 84 should be HIP welded or gas pressure bonded to seal tubular member 84 to laminate 69. With proper HIP welding, sleeve 85 is intimately bonded to core 70 and sheath 72, and first and second flanges 88 and 89 are intimately bonded to first and second plates 80 and 81 respectively.

Hollow tubular member 80 can be gas pressure welded or HIP welded to laminate 69, in conformance with the Metals and Ceramics Information Center Report No. MCIC-77-34 published by the Battelle Columbus Laboratories in November, 1977.

With the tubular member 84 inserted in the laminate 69 as shown in FIG. 5, the laminate 69 and all such members 84 are placed inside a sheet metal container having a pressure transmitting media tightly packed between the container and the laminate 69 and in the passageway 91 of each tubular member 84. That is, the pressure transmitting media is tightly packed in all the space within the container not occupied by the laminate 69 and tubular members 84.

The pressure transducing or transmitting media can be of the type known in the art such as powdered metal, beaded glass such as "Vycor," or amorphous silica. Preferably, passageways 91 are snugly fitted with a solid or fully densified rod of the pressure transducing media, metal or silica, which fluidizes or softens upon the application of heat and pressure during the HIP'ing process as should the rest of the transmitting medium, to insure a full application of pressure to sleeve 85 to intimately bond the exterior of sleeve 85 to laminate 69.

Preferably, the pressure transmitting media should not become, so fluid so as to "wick" or flow between the surfaces to be bonded together.

Subsequently, the pressure transmitting media is removed by any suitable means, such as leaching.

It is to be noted, however, that the elements 74 and/or members 84 may be HIP welded to laminate 69 and/or each other if the flanges 78, 79 and 87 are hermetically sealed or welded (e.g. EB welded) to laminate 69, in the argon fluid of a conventional HIP'ing system. That is, the sheet metal box and special pressure transducing media may be dispensed with.

Thus, with HIP welding, flanges 88 and 89 are metallurgically bonded to sheath 72, and sleeve 85 is metallurgically bonded to core 70 and sheath 72 to provide a laminated feeder fiberization wall 14 wherein the tubular member 84 is in good electrical and thermal contact with laminate 69.

As shown in FIG. 5, projection 86 extends outwardly from first plate 80, and generally into the fiber forming zone. While second plate 81 of sheath 72 would normally be placed in contact with a molten glass or inorganic material. Thus, a "tip-type" fiberization wall is produced from a laminate 69 and a unitary member 84.

Since refractory metals are highly creep resistant, or even substantially "creep" free, even at elevated temperatures, fiber forming feeders produced according to the principles of this invention have good "sag" resistance. That is, the fiberization walls should not deform or bow as much as an all precious metal feeder. In some instances "sag" can be substantially eliminated over the life of the feeder. Thus finshield alignments and the like with respect to the fiberization wall and/or tips can remain essentially fixed over the life of the feeder.

Laminated wall 69 having tubular members 84 established therein may be fabricated into a textile fiber feeder having a substantially flat bottom wall or may be fabricated into a cylindrical wall 54 wherein the tubular members extend radially outward from the axis of rotation of rotor 50.

Other systems for producing a feeder fiberization wall having a precious metal liner insert and/or tubular members associated therewith are found in concurrently filed patent applications Ser. No. 200,676, filed on Oct. 27, 1980, in names of Mohinder S. Bhatti and Alfred Marzocchi, Ser. No. 200,650, filed on Oct. 27, 1980, in names of Mohinder S. Bhatti and Alfred Marzocchi Ser. No. 200,651, filed on Oct. 27, 1980, in name of Mohinder S. Bhatti, all of which are hereby incorporated by reference.

It is apparent that within the scope of the invention, modifications and different arrangements can be made other than as herein disclosed. The present disclosures merely illustrative with the invention comprehending all variations thereof.

INDUSTRIAL APPLICABILITY

The inventions disclosed herein is readily applicable to the glass fiber industry.

I claim:

1. A laminated wall for a feeder for supplying molten streams of glass to be attenuated into filaments comprising:
   a refractory metal core having an oxygen impervious, precious metal sheath intimately bonded therein by hot isostatically pressing to form a laminate,
   said laminate having at least one aperture extending therethrough; and
   a tubular member having a sleeve having a projection extending beyond a first flange located intermediate said first flange and a second flange, said tubular member being sealed to said laminate to prevent the oxidization of said core at elevated temperatures.

2. The feeder wall of claim 1 wherein the first flange and the second flange are sealed to the precious metal sheath by electron beam or laser welding.

3. The feeder wall of claim 1 wherein said projection of said sleeve is oriented to extend outwardly from said wall into the fiber forming zone.

4. The feeder wall of claims 1 or 3 wherein said tubular member is intimately bonded to said laminate by hot isostatically pressing said tubular member and said laminate.

5. The feeder wall of claim 1 wherein said first and said second flange are sealed to the exterior of said sheath.

6. The method of producing a laminated wall for an inorganic fiber forming feeder comprising:
   providing a laminate comprised of a refractory metal core having an oxygen impervious, precious metal sheath intimately bonded thereto by hot isostatically pressing, said laminate having at least one aperture extending therethrough;
   inserting a member having a sleeve having a projection extending beyond a first flange into said orifice such that said first flange is in contact with said sheath;
   establishing a second flange on said sleeve in contact with said sheath; and
   sealing said tubular member to said laminate to prevent the oxidization of the said core at elevated temperatures, said projection being adapted to define a stream of molten inorganic material.

7. The method of claim 6 wherein said tubular member has a passageway extending substantially therethrough prior to the insertion of said member into said orifice.

8. The method of claim 6 wherein said flanges are electron beam or laser welded to said sheath.

9. The method of claim 6 wherein said member is intimately bonded to said laminate by hot isostatically pressing.

10. The feeder wall produced according to the method of claims 6 or 9.

11. A method of forming glass filaments comprising:
    providing a laminated wall for a feeder for supplying molten streams of glass to be attenuated into filaments comprising: a refractory metal core having an oxygen impervious, precious metal sheath intimately bonded thereto by hot isostatically pressing to form a laminate; said laminate having at least one aperture extending therethrough; a tubular member having a sleeve having a projection extending beyond a first flange located intermediate said first flange and a second flange, wherein said tubular member is sealed to said laminate to prevent the oxidization of said core at elevated temperatures, said projection being adapted to define a stream of molten glass; and attenuating the molten stream into a filament.

12. The feeder wall of claim 1 wherein the core is a material selected from the group consisting of Ti, V, Cb, Ta, Cr, Mo, W, Re and base alloys thereof and wherein said sheath is a material of the group consisting of Pt, Pd, Ir, Os, Rh, Ru and base alloys thereof.

13. The feeder wall of claim 1 wherein said refractory metal is an alloy of Mo, Ti, and Zr.

14. The feeder wall of claim 7 wherein said sheath is an alloy of Pt and Rh.

15. A laminated wall for a feeder for supplying molten streams of glass to be attenuated into filaments comprising:
    a refractory metal core having an oxygen impervious, precious metal first layer intimately bonded thereto by hot isostatically pressing to form a laminate,
    said laminate having at least one aperture extending therethrough; and
    a tubular member having a sleeve having a projection extending beyond a first flange, said first flange being sealed to said first layer.

16. The feeder wall of claim 15 further comprising an oxygen impervious, precious metal second layer intimately bonded to said core by hot isostatic pressing opposite said first layer and wherein a second flange of said tubular member is sealed to said second layer.

17. The method of producing a laminated wall for an inorganic fiber forming feeder comprising:
    providing a laminate comprised of a refractory metal core having an oxygen impervious, precious metal first layer intimately bonded thereto by hot isostatically pressing, said laminate having at least one aperture extending therethrough;
    inserting a member having a sleeve having a projection extending beyond a first flange into said orifice such that said first flange is in contact with said first layer; said sleeve being located in said aperture, said projection extending away from said first layer; and
    sealing said first flange to said first layer, said projection being adapted to define a stream of molten inorganic material.

18. The method of claim 17 wherein an oxygen impervious, precious metal second layer is bonded to the opposite side of said core from said first layer by hot isostatic pressing to form said laminate and further comprising sealing said second flange to said second layer.

19. A feeder for supplying streams of molten glass to be attenuated into filaments comprising:
    a plurality of layers of material wherein one of said layers is a refractory metal and another of said layers is an oxygen impervious, precious metal, said plurality of layers being initimately bonded together by the application of isostatic pressure and heat to form a unitary laminate, said laminate having a plurality of apertures extending therethrough; and
    a plurality of elements bonded to the laminate and positioned in said apertures to prevent the oxidation of the refractory metal at elevated temperatures, said elements having (a) an orifice adapted to permit the molten glass to flow therethrough to provide said streams of molten glass, (b) a sleeve positioned the aperture, (c) a flange bonded to said precious metal layer and (d) a projection extending beyond said flange and said laminate.

20. A feeder for flowing a stream of molten inorganic material therethrough comprising:
a plurality of layers of material wherein one of said layers is a refractory metal and another of said layers is an oxygen impervious, precious metal, said plurality of layers being intimately bonded together by the application of isostatic pressure and heat to form a unitary laminate, said laminate having an aperture extending therethrough; and pl an element bonded to the laminate and positioned in said aperture to prevent the oxidation of the refractory metal at elevated temperatures, said element having (a) an orifice adapted to permit the molten material to flow therethrough, (b) a sleeve positioned said aperture, (c) a flange bonded to said precious metal layer and (d) a projection extending beyond said flange and said lamiinate.

21. The feeder of claims 19 or 20 wherein said refractory metal and said precious metal are intimately bonded together.

22. The feeder of claim 21 where said refractory metal and said precious metal are metalurgically bonded together.

23. The feeder of claims 19 or 20 wherein said plurality of layers include a plurality of precious metal layers positioned at the exterior of said laminate.

24. The feeder of claims 19 or 20 wherein the refractory metal layer is a material selected from the group consisting of Ti, V, Cb, Ta, Cr, Mo, W, Re and base alloys thereof and wherein said precious metal layer is a material of the group consisting of Pt, Pd, Ir, Os, Rh, Ru and base alloys thereof.

25. The feeder of claim 24 wherein said element is a material of the group consisting of Pt, Pd, Ir, Os, Rh, Ru and base alloys thereof and wherein said element is intimately bonded to said refractory metal.

26. A method of making a feeder for supplying streams of molten glass to be attenuated into filaments comprising:
assembling a plurality of layers of material wherein one of said layers is a refractory metal and another of said layers is a precious metal;
isostatically pressing said plurality of layers; heating the isostatically pressed layers to intimately bond the plurality of layers to form a unitary laminate;
forming a plurality of apertures in the laminate; and
bonding elements to the laminate, said elements having (a) an orifice adapted to permit the molten glass to flow therethrough to provide said strema (b) a sleeve positioned said apertures, (c) a flange bonded to said precious metal layer and (d) a projection extending beyond said flange and said laminate, said precious metal layer and said element preventing the oxidation of said refractory metal layer at elevated temperatures.

27. A method of making a feeder for flowing a stream of molten inorganic material therethrough comprising:
assembling a plurality of layers of material wherein one of said layers is a refractory metal and another of said layers is a precious metal;
isostatically pressing said plurality of layers;
heating the isostatically pressed layers to intimately bond the plurality of layers to form a unitary laminate;
forming an aperture in the laminate; and
bonding an element to the laminate;
said element having (a) an orifice adapted to permit the molten material to flow therethrough, (b) a sleeve positioned said aperture, (c) a flange bonded to said precious metal layer and (d) a projection extending beyond said flange and said laminate, said precious metal layer and said element preventing the oxidation of said refractory metal layer at elevated temperatures.

28. The method of claims 26 and 27 wherein the refractory metal layer is a material selected from the group consisting of Ti, V, Cb, Ta, Cr, Mo, W, Re and base alloys thereof and wherein said precious metal layer is a material of the group consisting of Pt, Pd, Ir, Os, Rh, Ru and base alloys thereof.

29. The method of claim 28 wherein the refractory metal is intimately bonded to said precious metal.

30. The method of claim 29 wherein the refractory metal is diffusion bonded to said precious metal.

* * * * *